US008335603B2

(12) United States Patent
Mitsutani et al.

(10) Patent No.: US 8,335,603 B2
(45) Date of Patent: Dec. 18, 2012

(54) VEHICLE, CONTROL METHOD OF VEHICLE, AND DRIVING APPARATUS

(75) Inventors: Noritake Mitsutani, Toyota (JP); Wataru Shiraishi, Hekinan (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 360 days.

(21) Appl. No.: 12/667,786

(22) PCT Filed: Jul. 11, 2008

(86) PCT No.: PCT/JP2008/062571
§ 371 (c)(1),
(2), (4) Date: Feb. 16, 2010

(87) PCT Pub. No.: WO2009/008501
PCT Pub. Date: Jan. 15, 2009

(65) Prior Publication Data
US 2010/0152940 A1 Jun. 17, 2010

(30) Foreign Application Priority Data

Jul. 12, 2007 (JP) .................................. 2007-182798

(51) Int. Cl.
*G06F 19/00* (2011.01)
*B60K 6/442* (2007.10)
*B60K 6/445* (2007.10)
*B60W 20/00* (2006.01)

(52) U.S. Cl. .................... 701/22; 180/65.23; 180/65.21; 180/65.265; 180/65.285; 180/65.28; 903/930

(58) Field of Classification Search ..................... 701/22, 701/101, 89; 320/152, 109; 324/537, 764.01; 318/801, 805, 139; 180/65.25
See application file for complete search history.

(56) References Cited

U.S. PATENT DOCUMENTS 6,653,812 B1 * 11/2003 Huo et al. ..................... 318/801
7,213,665 B2 * 5/2007 Yamaguchi et al. ....... 180/65.27
(Continued)

FOREIGN PATENT DOCUMENTS
EP 1795726 A1 * 6/2007
(Continued)

OTHER PUBLICATIONS

International Search Report mailed on Oct. 14, 2008 in corresponding International Application No. PCT/JP2008/062571.

*Primary Examiner* — Tuan C. To
*Assistant Examiner* — Kevin P Mahne
(74) *Attorney, Agent, or Firm* — Oliff & Berridge, PLC

(57) ABSTRACT

Upon the occurrence of the abnormality that the inverter for driving the motor is in the one-phase short circuited state, this inverter is stopped in the three-phase short circuited state and sets the execution torque by subtracting the counter electromotive force application torque that is applied the driveshaft due to the counter electromotive force generated by rotation of the motor and the steering angle application torque corresponding to the steering angle from the torque demand according to the step-on amount of the accelerator pedal. The engine and the inverter for driving the motor is controlled so that the vehicle is driven with the set execution torque. This enables the driving force output to the driveshaft from the engine and the motor to be in accordance with the torque demand.

9 Claims, 7 Drawing Sheets

U.S. PATENT DOCUMENTS

| | | | |
|---|---|---|---|
| 7,478,691 B2* | 1/2009 | Yamaguchi et al. | 180/65.28 |
| 7,607,499 B2* | 10/2009 | Egami | 180/65.265 |
| 2001/0048226 A1* | 12/2001 | Nada | 290/40 C |
| 2003/0033060 A1* | 2/2003 | Okoshi | 701/22 |
| 2006/0052915 A1* | 3/2006 | Sato | 701/22 |
| 2006/0175995 A1* | 8/2006 | Shinmura et al. | 318/139 |
| 2006/0207813 A1* | 9/2006 | Ishikawa et al. | 180/65.4 |
| 2006/0247829 A1* | 11/2006 | Sato | 701/22 |
| 2007/0093359 A1* | 4/2007 | Kobayashi et al. | 477/107 |
| 2007/0255463 A1* | 11/2007 | Kikuchi | 701/22 |
| 2010/0030412 A1* | 2/2010 | Mitsutani | 701/22 |
| 2010/0152940 A1* | 6/2010 | Mitsutani et al. | 701/22 |
| 2012/0046813 A1* | 2/2012 | Schleser et al. | 701/22 |
| 2012/0181970 A1* | 7/2012 | Yuuki et al. | 318/716 |
| 2012/0217937 A1* | 8/2012 | Miyauchi et al. | 322/28 |

FOREIGN PATENT DOCUMENTS

| | | |
|---|---|---|
| JP | A-2001-329884 | 11/2001 |
| JP | A-2006-63819 | 3/2006 |
| JP | A-2006-197717 | 7/2006 |
| JP | A-2006-288051 | 10/2006 |
| JP | A-2007-28733 | 2/2007 |
| JP | A-2007-137174 | 6/2007 |
| JP | A-2007-331683 | 12/2007 |

* cited by examiner

VEHICLE, CONTROL METHOD OF VEHICLE, AND DRIVING APPARATUS

TECHNICAL FIELD

The present invention relates to a vehicle, a control method of the vehicle, and a driving apparatus. More specifically the invention pertains to a vehicle, a control method of the vehicle, and a driving apparatus included along with an internal combustion engine and an accumulator capable of charge and discharge in a power output apparatus capable of outputting power to a driveshaft.

BACKGROUND ART

One proposed configuration of a vehicle has an engine, a first motor, a planetary gear mechanism that an output shaft of the engine and a rotating shaft of the first motor are connected and an axle of the vehicle is linked, and a second motor linked with the axle of the vehicle and constructed as a synchronous motor generator. The proposed vehicle counters abnormality of an inverter for driving the second motor (see, for example, Patent Document 1). In this vehicle, upon occurrence of abnormality that an inverter for driving the second motor connected to front wheels is overheated, output torque from the second motor is decreased and output torque from a third motor connected to rear wheels is increased to prevent the inverter from overheating while outputting a torque demand required for the vehicle.

Patent Document 1: Japanese Patent Laid-Open No. 2006-197717

DISCLOSURE OF THE INVENTION

As abnormality that may occur in the above vehicle, there is abnormality considered that a switching element of the inverter for driving the second motor is fixed in its on state. In this case, the second motor is not able to be driven, so that it is considered to ensure a driving force required for driving the vehicle at least in retreat driving by driving the engine and the first motor. In the case of using, for example, a permanent magnet (PM) type synchronous motor as the second motor, a closed circuit is formed in a phase of three-phase coils, and a braking force is applied to the vehicle due to a counter electromotive force generated by rotation of a rotor of the second motor. It is then becomes difficult to have the vehicle driven with a driving force according to driver's accelerator operation.

In the vehicle, the control method of the vehicle, and the driving apparatus, the main object of the invention is to output driving force according to requirement even upon occurrence of the closed circuit forming abnormality that a closed circuit is formed in an inverter for driving a motor.

In order to attain the above main object, the vehicle, the control method of the vehicle, and the driving apparatus have the configurations discussed below.

According to one aspect, the present invention is directed to a vehicle. The vehicle has: an internal combustion engine; an electric power-mechanical power input output assembly, having a generator constructed to input and output power, linked to an axle of the vehicle and connected with an output shaft of the internal combustion engine in such a manner as to be rotatable independently of the axle, and configured to input and output power to and from the axle and the output shaft through input and output of electric power and mechanical power; a motor constructed to input and output power to and from the axle of the vehicle or a different axle of the vehicle from the axle and to generate a counter electromotive force by rotation; a first inverter circuit for driving the generator; a second inverter circuit for driving the motor; an accumulator configured to supply and receive electric power to and from the generator and the motor via the first inverter circuit and the second inverter circuit; a closed circuit forming abnormality detection module that detects a closed circuit forming abnormality that at least one closed circuit is formed in a part of phases of the second inverter circuit; a driving force demand setting module that sets a driving force demand required for driving the vehicle; and a controller configured to, when the closed circuit forming abnormality is detected by the closed circuit forming abnormality detection module, control the second inverter circuit so that switching elements of the second inverter circuit are stopped in a preset switching state while controlling the internal combustion engine and the first inverter circuit so that the vehicle is driven with an execution driving force that is a driving force based on a sum of the set driving force demand and a cancellation driving force for canceling at least a part of a braking force applied to the vehicle from the counter electromotive force generated by rotation of the motor.

The vehicle according to this aspect of the invention, upon occurrence of the closed circuit forming abnormality that at least one closed circuit is formed in a part of phases of the second inverter circuit for driving the motor, controls the second inverter circuit so that switching elements of the second inverter circuit are stopped in a preset switching state while controlling the internal combustion engine and the first inverter circuit so that the vehicle is driven with an execution driving force that is a driving force based on a sum of a driving force demand required for driving the vehicle and a cancellation driving force for canceling at least a part of a braking force applied to the vehicle from the counter electromotive force generated by rotation of the motor. This arrangement enables the driving force output from the internal combustion engine and the electric power-mechanical power input output assembly to be in accordance with the driving force demand, and enables the vehicle to be driven with the driving force according to the driving force demand.

In one preferable application of the vehicle of the invention, the preset switching state may be a switching state that closed circuits are formed in all phases of the second inverter circuit. This arrangement enables to reduce the braking force applied to the vehicle from the counter electromotive force generated by rotation of the motor.

In another preferable application of the vehicle of the invention, the controller may be configured to control the internal combustion engine and the first inverter circuit using the cancellation driving force that is obtained from a rotation speed-driving force relation predetermined as a relation between a rotation speed of the motor and the cancellation driving force. This arrangement enables to obtain the cancellation driving force easily.

In still another preferable application of the vehicle of the invention, the controller may be configured to set a steering angle driving force having a tendency to be greater according to a steering angle of the vehicle being greater and control the internal combustion engine and the first inverter circuit using the execution driving force as a sum of the set steering angle driving force, the cancellation driving force and the set driving force demand. This arrangement enables to have the execution driving force in accordance with the steering angle driving force and to have the vehicle driven with the driving force according to the steering angle driving force.

In a preferable arrangement of the vehicle of the invention, the controller may be configured to control the internal combustion engine and the first inverter circuit so that the vehicle is driven with the execution driving force within a range of input and output limits defined as allowable charging and discharging electric power to be charged in and discharged from the accumulator. This arrangement effectively prevents the accumulator from being charged and discharged with excessive electric power.

In another preferable arrangement of the vehicle of the invention, the vehicle may further include: a second motor constructed, as different from the motor, to supply and receive electric power to and from the accumulator and to input and output power to and from the axle of the vehicle or a different axle of the vehicle from the axle; and a third inverter circuit for driving the second motor, wherein the controller is configured to control the internal combustion engine, the first inverter circuit and the third inverter circuit so that the vehicle is driven with the execution driving force while outputting power from the second motor.

In still another preferable arrangement of the vehicle of the invention, the electric power-mechanical power input and output assembly may include a three shaft-type power input output structure connected to three shafts, a driveshaft linked to the axle of the vehicle, the output shaft of the internal combustion engine, and a rotating shaft of the generator, and designed to input and output power to residual shaft based on powers input from and output to any two shafts among the three shafts.

According to another aspect, the present invention is directed to a driving apparatus included, along with an internal combustion engine and an accumulator capable of charge and discharge, in a power output apparatus capable of outputting power to a driveshaft. The driving apparatus has: an electric power-mechanical power input output assembly, having a generator constructed to input and output power, connected with the driveshaft and with an output shaft of the internal combustion engine in such a manner as to be rotatable independently of the driveshaft, and configured to supply and receive electric power to and from the accumulator and to input and output power to and from the driveshaft and the output shaft through input and output of electric power and mechanical power; a motor constructed to input and output power to and from the driveshaft and to generate a counter electromotive force by rotation; a first inverter circuit for driving the generator; a second inverter circuit for driving the motor; an accumulator configured to supply and receive electric power to and from the generator and the motor via the first inverter circuit and the second inverter circuit; a closed circuit forming abnormality detection module that detects a closed circuit forming abnormality that at least one closed circuit is formed in a part of phases of the second inverter circuit; a driving force demand setting module that sets a driving force demand required for the driveshaft; and a controller configured to, when the closed circuit forming abnormality is detected by the closed circuit forming abnormality detection module, control the second inverter circuit so that switching elements of the second inverter circuit are stopped in a preset switching state while controlling the first inverter circuit along with control of the internal combustion engine so that an execution driving force is output to the driveshaft, the execution driving force being a driving force based on a sum of the set driving force demand and a cancellation driving force for canceling at least a part of a braking force applied to the driveshaft from the counter electromotive force generated by rotation of the motor.

The driving apparatus according to this aspect of the invention, upon occurrence of the closed circuit forming abnormality that at least one closed circuit is formed in a part of phases of the second inverter circuit for driving the motor, controls the second inverter circuit so that switching elements of the second inverter circuit are stopped in a preset switching state while controlling the internal combustion engine and the first inverter circuit so that the vehicle is driven with an execution driving force that is a driving force based on a sum of a driving force demand required for driving the vehicle and a cancellation driving force for canceling at least a part of a braking force applied to the vehicle from the counter electromotive force generated by rotation of the motor. This arrangement enables the driving force output from the internal combustion engine and the electric power-mechanical power input output assembly to be in accordance with the driving force demand, and enables the vehicle to be driven with the driving force according to the driving force demand.

According to still another aspect, the present invention is directed to a control method of a vehicle. The vehicle includes: an internal combustion engine; an electric power-mechanical power input output assembly, having a generator constructed to input and output power, linked to an axle of the vehicle and connected with an output shaft of the internal combustion engine in such a manner as to be rotatable independently of the axle, and configured to input and output power to and from the axle and the output shaft through input and output of electric power and mechanical power; a motor constructed to input and output power to and from the axle of the vehicle or a different axle of the vehicle from the axle and to generate a counter electromotive force by rotation; a first inverter circuit for driving the generator; a second inverter circuit for driving the motor; and an accumulator configured to supply and receive electric power to and from the generator and the motor via the first inverter circuit and the second inverter circuit. The control method, upon occurrence of the closed circuit forming abnormality that at least one closed circuit is formed in a part of phases of the second inverter circuit, controls the second inverter circuit so that switching elements of the second inverter circuit are stopped in a preset switching state while controlling the internal combustion engine and the first inverter circuit so that the vehicle is driven with an execution driving force that is a driving force based on a sum of a driving force demand required for driving the vehicle and a cancellation driving force for canceling at least a part of a braking force applied to the driveshaft from the counter electromotive force generated by rotation of the motor.

The control method of the vehicle according to this aspect of the invention, upon occurrence of the closed circuit forming abnormality that at least one closed circuit is formed in a part of phases of the second inverter circuit for driving the motor, controls the second inverter circuit so that switching elements of the second inverter circuit are stopped in a preset switching state while controlling the internal combustion engine and the first inverter circuit so that the vehicle is driven with an execution driving force that is a driving force based on a sum of a driving force demand required for driving the vehicle and a cancellation driving force for canceling at least a part of a braking force applied to the vehicle from the counter electromotive force generated by rotation of the motor. This arrangement enables the driving force output from the internal combustion engine and the electric power-mechanical power input output assembly to be in accordance with the driving force demand, and enables the vehicle to be driven with the driving force according to the driving force demand.

BEST MODES OF CARRYING OUT THE INVENTION

Figure 1:
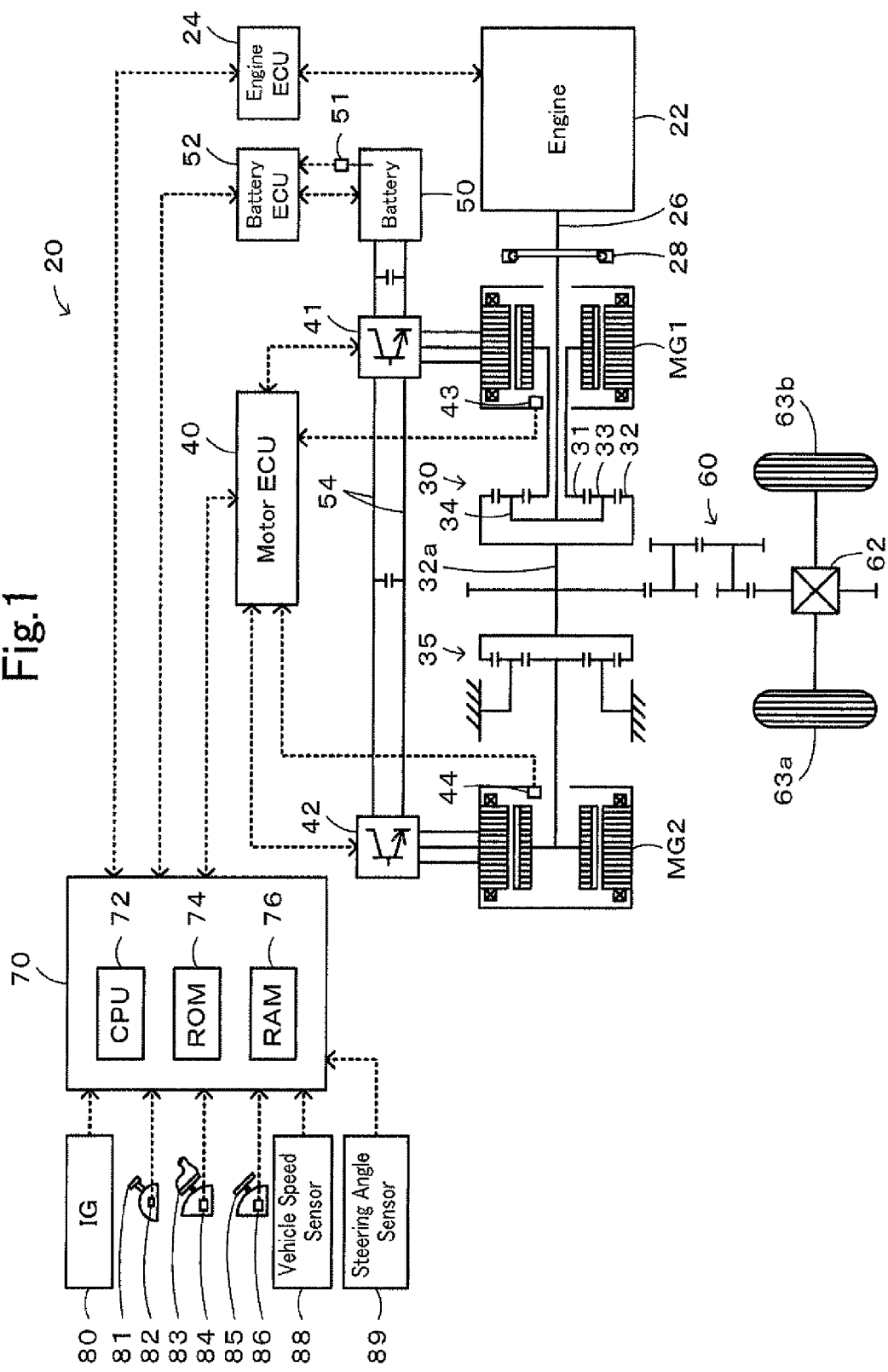
FIG. 1 is a schematic illustration of the configuration of a hybrid vehicle 20 in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole power output apparatus.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit (hereafter referred to as engine ECU) 24 that inputs diverse signals from various sensors used to measure and detect the operating conditions of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements. The engine ECU 24 also computes a rotation speed of the crankshaft 26, which is equivalent to a rotation speed Ne of the engine 22, based on the crank position from the non-illustrated crank positions sensor.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Figure 2:
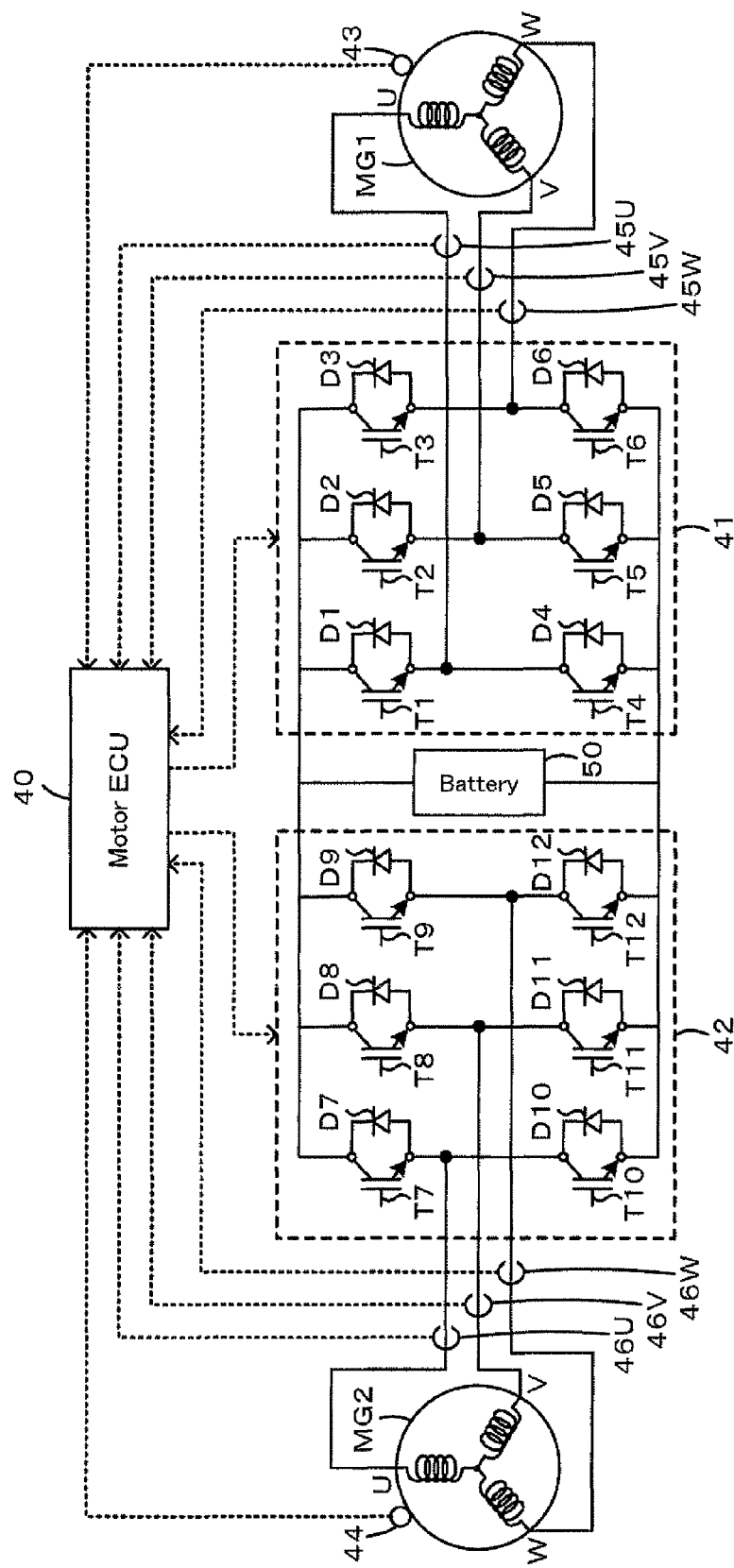
FIG. 2 is a schematic illustration of the configuration of an electric driving system including motors MG1 and MG2, inverters 41 and 42, and battery 50.

FIG. 2 is a schematic configuration of an electric driving system including motors MG1 and MG2. Both the motors MG1 and MG2 are constructed as known permanent magnet (PM) type synchronous motor generators having a rotor with permanent magnets attached to the outer surface thereof and a stator with three-phase coils wounded thereon. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. The inverter 41 consists of six transistors T1 through T6 and six diodes D1 through D6 arranged in parallel with but in an opposite direction to the corresponding transistors T1 through T6. The transistors T1 through T6 are arranged in pairs such that two transistors in each pair respectively function as a source and a sink to a common positive bus and a common negative bus of the power lines 54. The individual phases of the three-phase coils (U phase, V phase, and W phase) are connected to respective connection points of the three paired transistors. Controlling the rate of an on-time of the paired transistors T1 through T6 in the state of applying a voltage between the positive bus and the negative bus of the power lines 54 results in generating a revolving magnetic field on the three-phase coils to drive and rotate the motor MG1. The inverter 42 also consists of six transistors T7 through T12 and six diodes D7 through D12 arranged in the same way as the inverter 41. Controlling the rate of an on-time of the paired transistors T7 through T12 enables to drive and rotate the motor MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of the rotors in the motors MG1 and MG2 from rotational position detection sensors 43 and 44, and signals representing phase currents from current sensors 45U, 45V, 45W, 46U, 46V, and 46W for detecting phase currents flowing in the respective phases of the three-phase coils in the motors MG1 and MG2. The motor ECU 40 outputs switching control signals to the transistors T1 through T6 in the inverter 41 and to the transistors T7 through T12 in the inverter 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also computes rotation speeds Nm1 and Nm2 of the motors MG1 and MG2 based on the output signals of the rotational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge (SOC) and the battery temperature Tb.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and steering angle θ from a steering angle sensor 89 that detects an steering angle of a non-illustrated steering wheel. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, a motor drive mode, and direct transmitting drive mode as well. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. The direct transmitting drive mode, which is prepared as a mode of retreat driving for ensuring the vehicle driving regardless of occurrence of abnormality in the motor MG2 or the inverter 42 resulting in the motor MG2 disabled to be driven, drives and controls the motor MG1 to output negative torque and controls the operations of the engine 22 to bear the output torque of the motor MG1 for reversing the output torque at the power distribution integration mechanism 30 and outputting positive torque to the ring gear shaft 32a, while controlling the operations of the motor MG2 to stop.

Figure 3:
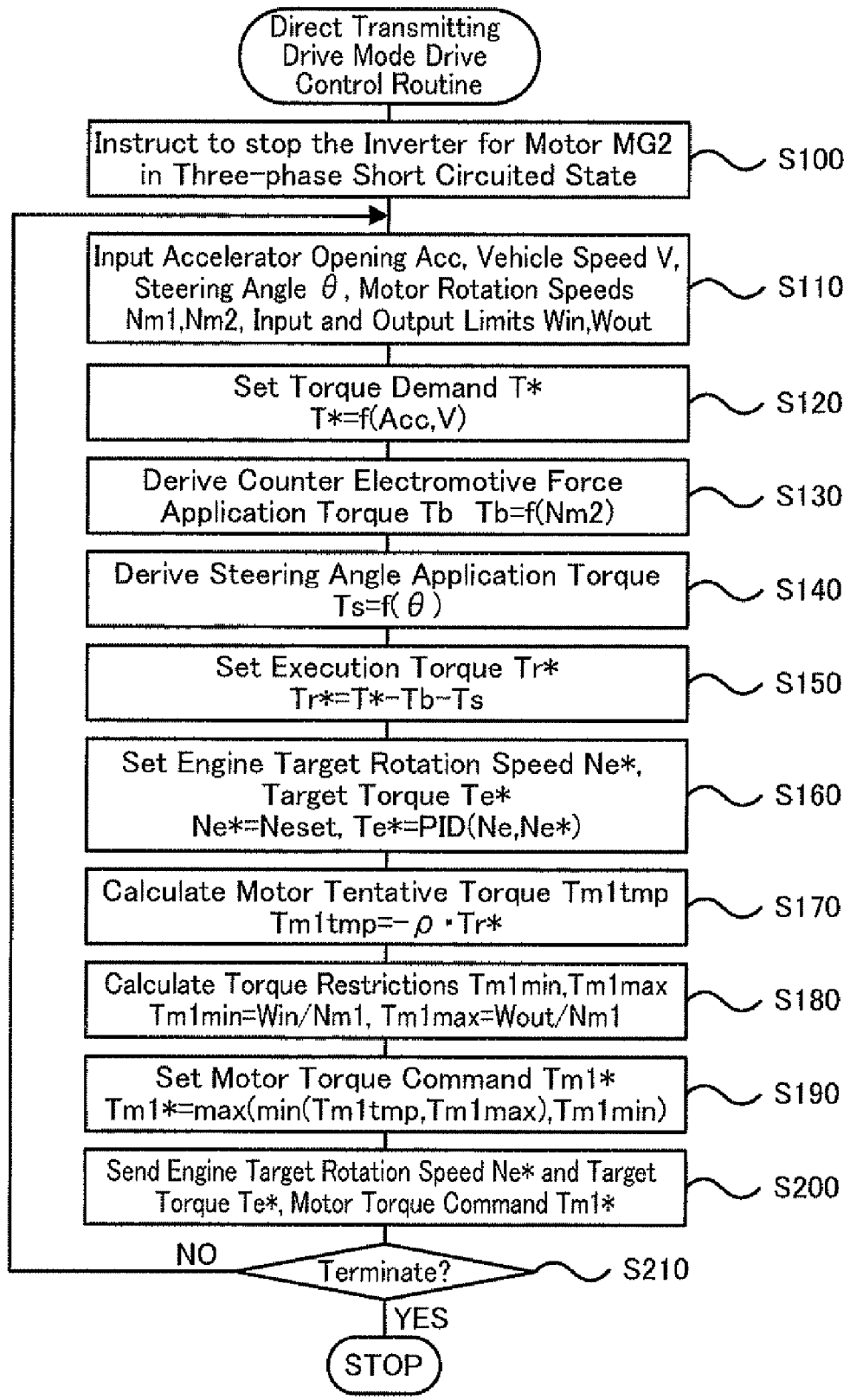
FIG. 3 is a flowchart showing a direct transmitting drive mode drive control routine executed by a hybrid electronic control unit 70 in the embodiment.

The description regards the operations of the hybrid vehicle 20 of the embodiment having the configuration discussed above, especially a series of operations for retreat driving in the direct transmitting drive mode upon the occurrence of the abnormality in the motor MG2 or the inverter 42 resulting in the motor MG2 disabled to be driven. FIG. 3 is a flowchart showing a direct transmitting drive mode drive control routine executed by the hybrid electronic control unit 70. This routine is performed, in the embodiment, when the abnormality that one of transistors T7 through T12 of the inverter 42 is fixed in its on state is detected based on the phase currents from the current sensors 46U, 46V, and 46W in a non-illustrated short circuit abnormality detection routine performed by the motor ECU 40, that is, upon detection of the abnormality that one phase of three-phase coils in the motor MG2 is short circuited.

In the direct transmitting drive mode drive control routine, the CPU 72 of the hybrid electronic control unit 70 outputs control signals to the motor ECU 40 for instructing to have all of the three phases of the three-phase coils in the motor MG2 be short-circuited (step S100). In response to reception of the control signals, the motor ECU 40 performs switching control so that the other two transistors at the same side as the side including the fixed one transistor in its on state of the inverter 42 (at the side of the transistors T7 through T9 or the side of the transistors T10 through T12 in FIG. 2) than the fixed one are also stopped in their on state. The reason why the inverter 42 is stopped in three-phase short circuited state is as a whole to reduce the phase currents generated from counter electromotive force in rotation of the motor MG2 compared to the phase currents generated in one-phase short circuited state.

Figure 4:
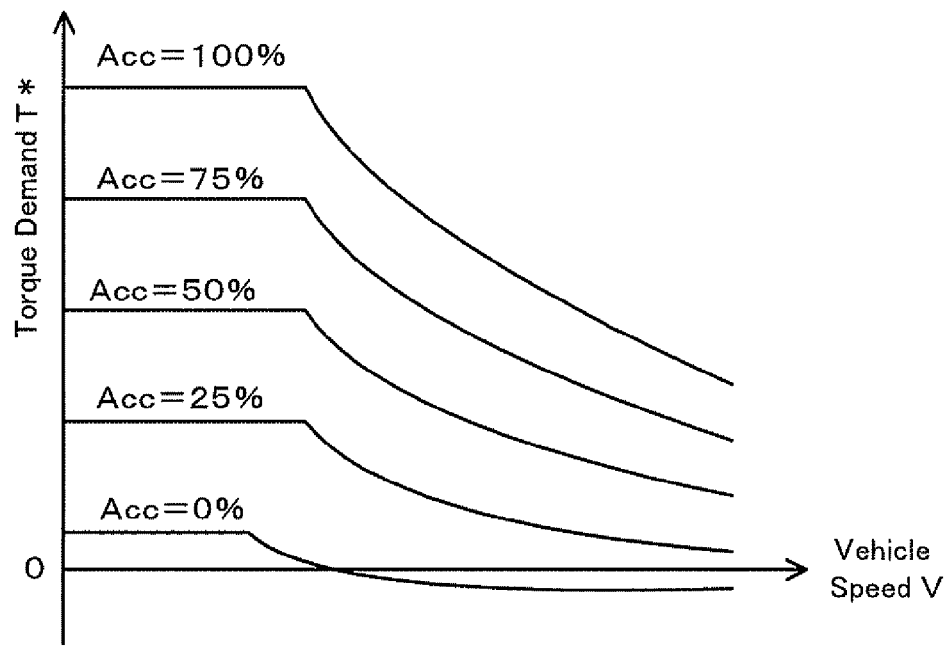
FIG. 4 is one example of a torque demand setting map.

The CPU 72 subsequently inputs various data such as the accelerator opening Acc from the accelerator pedal position sensor 84, the vehicle speed V from the vehicle speed sensor 88, the steering angle θ of the vehicle from the steering angle sensor 89, the rotation speeds Nm1 and Nm2 of the motors MG1 and MG2, and the input limit Win and the output limit Wout of the battery 50 (step S110), and sets a torque demand T* to be output to the ring gear shaft 32a or the driveshaft linked with the drive wheels 63a and 63b as a torque required for the hybrid vehicle 20 based on the input accelerator opening Acc and vehicle speed V (step S120). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The input limit Win and the output limit Wout of the battery 50 are set based on the battery temperature Tb and the state of charge (SOC) of the battery 50 and are input from the battery ECU 52 by communication. A concrete procedure of setting the torque demand T* in this embodiment provides and stores in advance variations in torque demand T* against the vehicle speed V with regard to various settings of the accelerator opening Acc as a torque demand setting map in the ROM 74 and reads the torque demand T* corresponding to the given accelerator opening Acc and the given vehicle speed V from this torque demand setting map. One example of the torque demand setting map is shown in FIG. 4.

Figure 5:
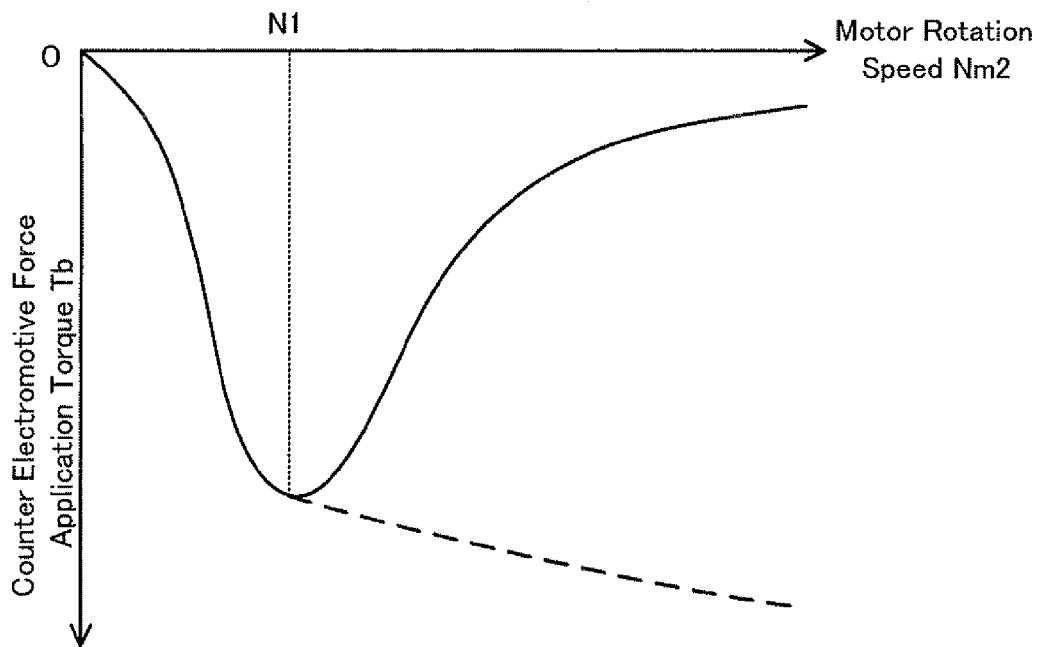
FIG. 5 is one example of a counter electromotive force application torque deriving map.
Figure 6:
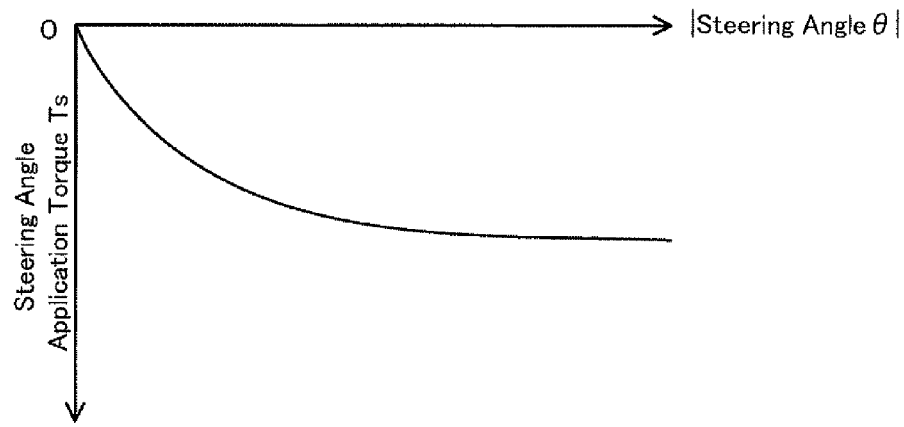
FIG. 6 is one example of a steering angle application torque deriving map.

After the data input and the setting of the torque demand T*, the CPU 72 derives a counter electromotive force application torque Tb that is applied as negative torque to the ring gear shaft 32a or the driveshaft from the counter electromotive force generated by rotation of the motor MG2 (step S130) and derives a steering angle application torque Ts that is able to be obtained through transformation of a braking force applied to the hybrid vehicle 20 according to the steering angle θ into a torque applied to the ring gear shaft 32a (step S140). The CPU 72 then sets an execution torque Tr* that is a torque to be output in this control to the ring gear shaft 32a or the driveshaft by subtracting both the derived counter electromotive force application torque Tb and the steering angle application torque Ts from the set torque demand T* (step S150). A concrete procedure of deriving the counter electromotive force application torque Tb in this embodiment provides and stores in advance by experiment or the like variations in the counter electromotive force application torque Tb against the rotation speed Nm2 of the motor MG2 as a counter electromotive force application torque deriving map in the ROM 74 and reads the counter electromotive force application torque Tb corresponding to the given rotation speed Nm2 of the motor MG2 from this counter electromotive force application torque deriving map. One example of the counter electromotive force application torque deriving map is shown in FIG. 5. In this figure, a broken line shows for comparison purposes the braking torque applied to the ring gear shaft 32a when the inverter 42 is kept in the state of occurrence of the one-phase short circuited abnormality without changing to the three-phase short circuited state. It is enabled to reduce more the absolute value of the counter electromotive force application torque Tb in an area where the rotation speed Nm2 of the motor MG2 is greater than the value N1 when the inverter 42 is in the three-phase short circuited than when the inverter 42 is in the one-phase short circuited state. A concrete procedure of deriving the steering angle application torque Ts in this embodiment provides and stores in advance by experiment or the like variations in the steering angle application torque Ts against the steering angle θ as a steering angle application torque deriving map in the ROM 74 and reads the steering angle application torque Ts corresponding to the given steering angle θ from this steering angle application torque deriving map. One example of the steering angle application torque deriving map is shown in FIG. 6. As shown in this figure, the absolute value of the steering angle application torque Ts is set to have a tendency to be greater according to the absolute value of the steering angle θ being greater. This setting is because the braking force applied to the vehicle becomes greater against the greater absolute value of the steering angle θ.

After setting the execution torque Tr*, the CPU 72 sets a target rotation speed Ne* of the engine 22 to a preset rotation speed Neset and sets a target torque Te* of the engine 22 based on the set target rotation speed Ne* and the input rotation speed Ne of the engine 22 according to Equation (1) given below (step S160):

$$Te^* = k1(Ne^* - Ne) + k2\int(Ne^* - Ne)dt \quad (1)$$

The preset rotation speed Neset is predetermined according to characteristics of the engine 22 and the like as a little greater rotation speed (for example, 900 rpm or 1000 rpm) than the lower limit of a rotation speed range that the engine 22 is operated with stability. Equation (1) is a relational expression of feedback control to operate the engine 22 at the target rotation speed Ne*. In Equation (1) given above, 'k1' in the first term and 'k2' in the second term on the right side respectively denote a gain of the proportional and a gain of the integral term.

The CPU 72 subsequently calculates a tentative torque Tm1tmp as a provisional value of torque to be output from the motor MG1 according to Equation (2) given below that reverses the sign of the result of the product of the set execution torque Tr* and a gear ratio ρ (a number of teeth of sun gear 31/a number of teeth of ring gear 32) of the power distribution integration mechanism 30 (step S170), calculates a lower torque restriction Tm1min and an upper torque restriction Tm1max as allowable minimum and maximum torques output from the motor MG1 according to Equations (3) and (4) given below that divides the input limit Win and the output limit Wout of the battery 50 respectively by the rotation speed Nm1 of the motor MG1 (step S180), and sets a torque command Tm1* of the motor MG1 by limiting the set tentative torque Tm1tmp with the set upper torque restriction Tm1max and lower torque restriction Tm1min according to Equation (5) below (step S190):

$$Tm1tmp = -\rho \cdot Tr^* \quad (2)$$

$$Tm1min = Win/Nm1 \quad (3)$$

$$Tm1max = Wout/Nm1 \quad (4)$$

$$Tm1^* = \max(\min(Tm1tmp, Tm1max), Tm1min) \quad (5)$$

After setting the target rotation speed Ne* and the target torque Te* of the engine 22 and the torque command Tm1* of the motors MG1, the CPU 72 sends the settings of the target rotation speed Ne* and the target torque Te* of the engine 22 to the engine ECU 24 and the settings of the torque command Tm1* of the motor MG1 to the motor ECU 40 (step S200) and determines satisfaction or dissatisfaction of a condition, such as occurrence of a change of the gearshift position. SP with finishing retreat drive, to allow termination of the vehicle driving in the direct transmitting driving mode (step S210). Upon dissatisfaction of the termination condition, the CPU 72 returns to the processing of step S110 and repeats a series of the processing of step S110 through S210. Upon satisfaction of the termination condition, the CPU 72 terminates the direct transmitting drive mode drive control routine. In response to reception of the settings of the target rotation speed Ne* and the target torque Te*, the engine ECU 24 performs required controls including intake air flow regulation, fuel injection control, and ignition control of the engine 22 to drive the engine 22 at the specific drive point defined by the combination of the target rotation speed Ne* and the target torque Te*.

In response to reception of the settings of the torque command Tm1*, the motor ECU 40 performs switching control of the transistors T1 through T6 of the inverter 41 to drive the motor MG1 with the torque command Tm1*.

Figure 7:
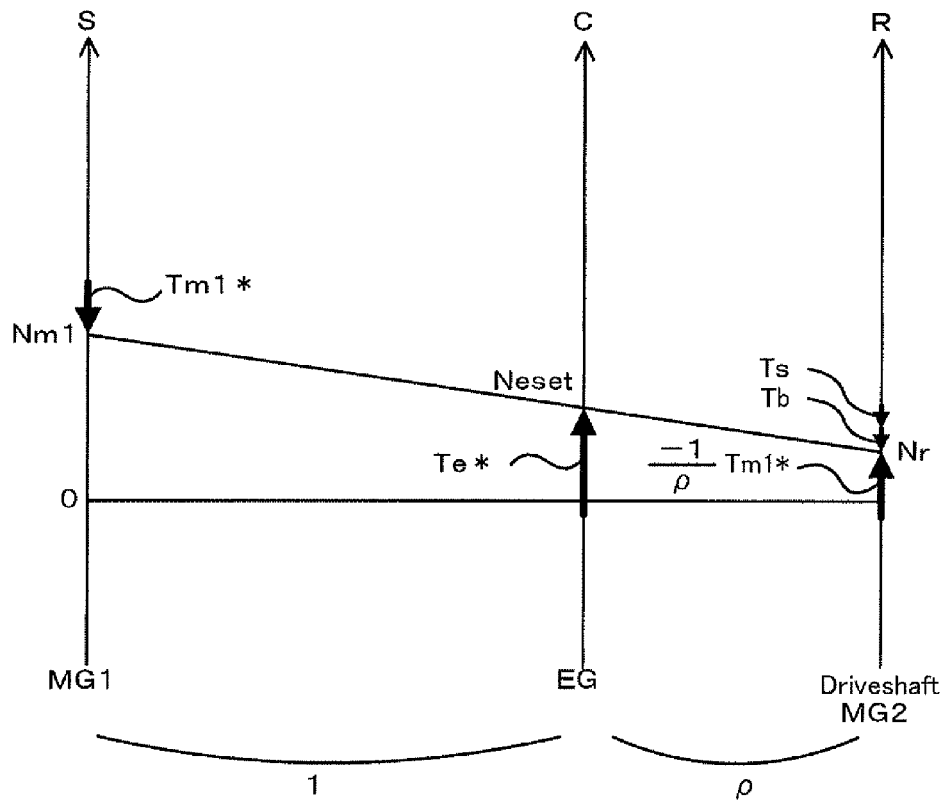
FIG. 7 is an alignment chart showing torque-rotation speed dynamics of the respective rotational elements included in the power distribution integration mechanism 30 during the drive of the hybrid vehicle 20 in the direct transmitting drive mode.

FIG. 7 is an alignment chart showing torque-rotation speed dynamics of the respective rotational elements included in the power distribution integration mechanism 30 during the drive of the hybrid vehicle 20 in the direct transmitting drive mode. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick downward arrows on the axis R respectively show the counter electromotive force application torque Tb and the steering angle application torque Ts both applied to the ring gear shaft 32a. A thick upward arrow on the axis 'R' show a torque applied to the ring gear shaft 32a by output of the torque from the motor MG1. Upon the occurrence of the abnormality that the inverter 42 becomes in the one-phase short circuited state, a braking torque is applied to the ring gear shaft 32a due to the counter electromotive force generated by rotation of the motor MG2 corresponding to the vehicle driving. If this braking torque is disregarded and the motor MG1 is controlled using the torque demand T* unchanged corresponding to the step-on amount of the accelerator pedal 83, a smaller torque than the torque demand T* by this braking torque is output to the ring gear shaft 32a or the driveshaft. It is then becomes difficult to have the vehicle driven with a driving force according to driver's accelerator operation. With consideration to this situation, in this embodiment, the motor MG1 is controlled by setting the execution torque Tr* to cancel the counter electromotive force application torque Tb. Furthermore, the inverter 42 is stopped in the three-phase short circuited state and the motor MG1 is controlled with inclusion of the corresponding torque to the steering angle application torque Ts based on the steering angle θ of the vehicle into the execution torque Tr*, so that the absolute value of the counter electromotive force application torque Tb is made smaller and the execution torque Tr* reflects the driving force according to the steering angle θ. These arrangements effectively enable the hybrid vehicle 20 to be driven with a driving force according to the torque demand T*.

In the hybrid vehicle 20 of the embodiment described above, upon the occurrence of the abnormality that the inverter 42 for driving the motor MG2 is in the one-phase short circuited state, controls the engine 22 and the inverter 41 for driving the motor MG1 so that the vehicle is driven with the execution torque Tr* based on the sum of a torque (−Tb) for cancelling the counter electromotive force application torque Tb applied due to the counter electromotive force generated by rotation of the motor MG2 and the torque demand T* corresponding to the step-on amount of the accelerator pedal 83. This arrangement enables the driving force output from the engine 22 and the motor MG1 to the ring gear shaft 32a or the driveshaft to be in accordance with the torque demand T* and enables the hybrid vehicle 20 driven in retreat driving with the driving force according to the torque demand T*. The arrangement of the inverter 42 stopped in the three-phase short circuited state enables to reduce the counter electromotive force application torque Tb applied to the ring gear shaft 32a. The arrangement of the execution torque Tr* set in accordance with the steering angle application torque Ts corresponding to the steering angle θ of the vehicle enables the hybrid vehicle 20 to be driven with the driving force according to the steering angle θ. The arrangement of deriving the counter electromotive force application torque Tb using the counter electromotive force application torque deriving map determining the relation between the rotation speed Nm2 of the motor MG2 and the counter electromotive force application torque Tb enables to obtain the counter electromotive force application torque easily. The arrangement of controlling the motor MG1 with the torque command Tm1* that is set within a range of the input limit Win and the output limit Wout of the battery 50 effectively prevents the accumulator from being charged and discharged with excessive electric power.

In the hybrid vehicle 20 of the embodiment, the execution torque Tr* is set in accordance with the steering angle application torque Ts corresponding to the steering angle θ of the vehicle. This is not essential and the execution torque Tr* may be set without any consideration of the steering angle application torque Ts.

In the hybrid vehicle 20 of the embodiment, the counter electromotive force application torque Tb is derived using the counter electromotive force application torque deriving map predetermining the relation between the rotation speed Nm2 of the motor MG2 and the counter electromotive force application torque Tb. This is not essential and the counter electromotive force application torque Tb may be obtained without using a predetermined map as long as a torque corresponding to at least a part of the braking torque applied to the ring gear shaft 32a or the driveshaft is obtained. The counter electromotive force application torque Tb may be, for example, estimated based on the phase currents from the current sensors 46U, 46V, and 46W.

In the hybrid vehicle 20 of the embodiment, upon the occurrence of the abnormality that the inverter 42 for driving the motor MG2 is in the one-phase short circuited state, the inverter 42 is controlled to stop in the three-phase short circuited state. This is not essential and the inverter 42 may be controlled to stop in the two-phase short circuited state upon the occurrence of the abnormality.

In the hybrid vehicle 20 of the embodiment, the technique of the invention is explained as the processing upon the occurrence of the abnormality that the inverter 42 for driving the motor MG2 is in the one-phase short circuited state. The technique of the invention is also applicable to the processing upon occurrence of the abnormality that the inverter 42 is in the two-phase short circuited state.

In the hybrid vehicle 20 of the embodiment, the motor MG2 is attached to the ring gear shaft 32a or the driveshaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 8:
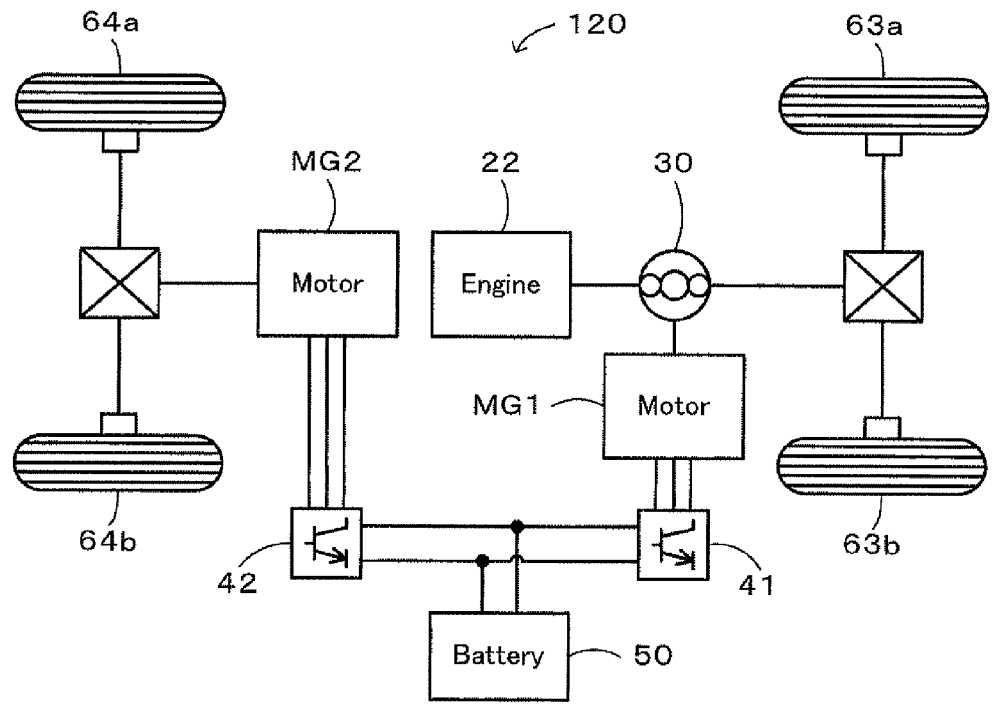
FIG. 8 is a schematic illustration of the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 8. In the hybrid vehicle 120 of FIG. 8, the motor MG2 is connected to another axle (an axle linked with wheels 64a and 64b) that is different from the axle connecting with the ring gear shaft 32a (the axle linked with the drive wheels 63a and 63b).

Figure 9:
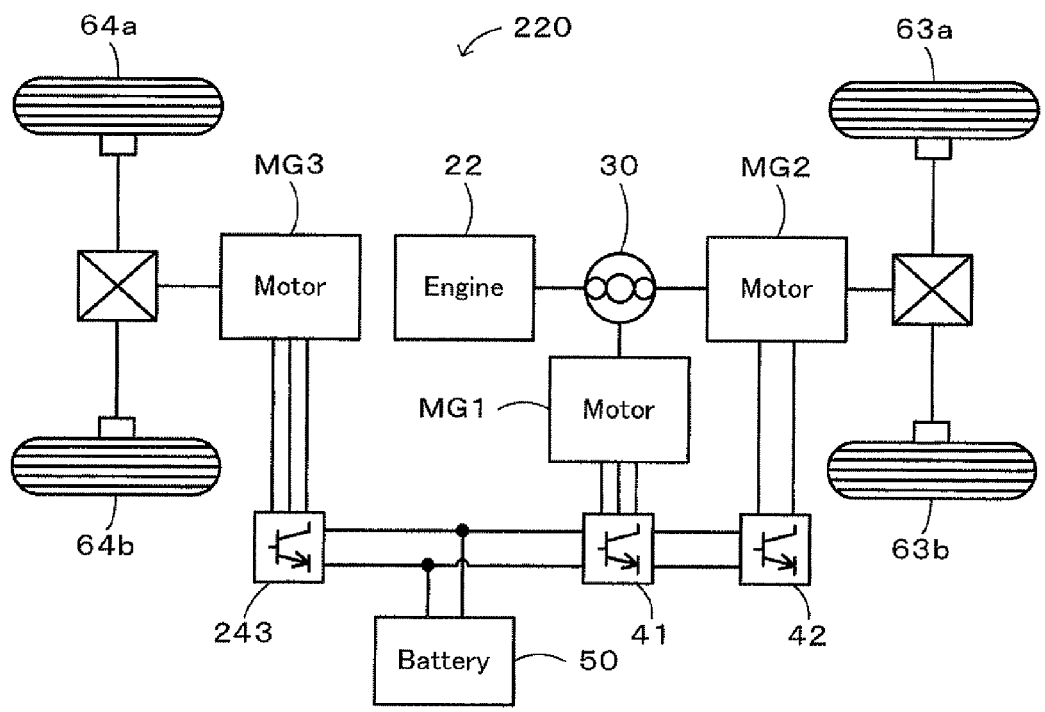
FIG. 9 is a schematic illustration of the configuration of still another hybrid vehicle 220 in another modified example.

In the hybrid vehicle 20 of the embodiment, the power of the engine 22 and the motor MG1 and the converted power of the motor MG2 by the reduction gear 35 are output to the ring gear shaft 32a. The technique of the invention is also applicable to a hybrid vehicle 220 of another modified structure shown in FIG. 9. In the hybrid vehicle 220 of FIG. 9, the power of a motor MG3 is, in addition, output to another axle (an axle linked with wheels 64*a* and 64*b*) that is different from the axle connecting with the ring gear shaft 32*a* (the axle linked with the drive wheels 63*a* and 63*b*). In this case, the an inverter 243 for driving the motor MG3 may be controlled so that the hybrid vehicle 20 is driven while outputting a torque from the motor MG3 corresponding to the restricted amount with the torque restrictions Tm1min and Tm1max in the tentative torque Tm1tmp of the embodiment.

Figure 10:
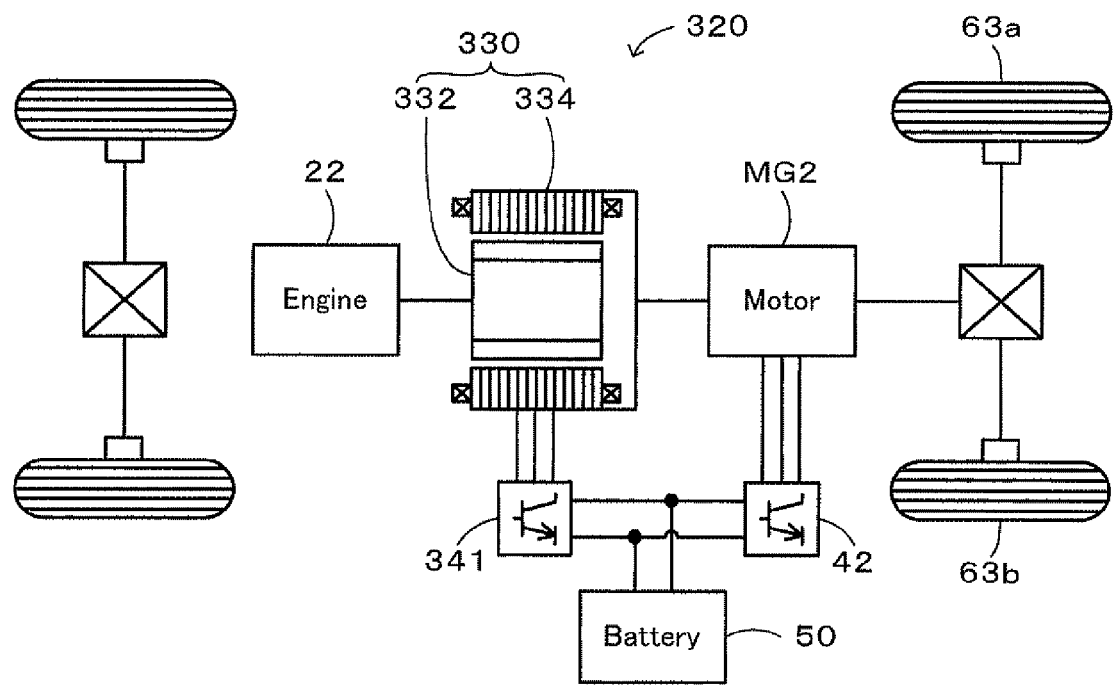
FIG. 10 is a schematic illustration of the configuration of still another hybrid vehicle 320 in still another modified example.

In the hybrid vehicle 20 of the embodiment, the power of the engine 22 is output via the power distribution integration mechanism 30 to the ring gear shaft 32*a* or the driveshaft linked with the drive wheels 63*a* and 63*b*. The technique of the invention is also applicable to a hybrid vehicle 320 of still another modified structure shown in FIG. 10. The hybrid vehicle 320 of FIG. 10 is equipped with a pair-rotor motor 330 and an inverter 341 for driving the pair-rotor motor 330. The pair-rotor motor 330 includes an inner rotor 332 connected to the crankshaft 26 of the engine and an outer rotor 334 connected to a driveshaft for outputting power to the drive wheels 63*a* and 63*b*. The pair-rotor motor 330 transmits part of the output power of the engine 22 to the driveshaft, while converting the residual engine output power into electric power.

The embodiment and its modified examples regard application of the invention to the hybrid vehicles. The principle of the invention may be actualized by diversity of other applications, for example, a driving apparatus included, along with an internal combustion engine and an accumulator unit such as a secondary battery, in a power output apparatus mounted on mobile equipment such as vehicles other than motor vehicles, boats and ships, and aircraft. The principle of the invention may be actualized by a control method of such a vehicle as well.

The primary elements in the embodiment and its modified examples are mapped to the primary constituents in the claims of the invention as described below. The engine 22 in the embodiment corresponds to the internal combustion engine in the claims of the invention. The combination of the power distribution integration mechanism 30 with the motor MG1 as the 'generator' corresponds to the 'electric power-mechanical power input output assembly' in the claims of the invention. The motor MG2 in the embodiment corresponds to the 'motor' in the claims of the invention. The inverter 41 in the embodiment corresponds to the 'first inverter circuit' in the claims of the invention. The inverter 42 in the embodiment corresponds to the 'second inverter circuit' in the claims of the invention. The battery 50 in the embodiment corresponds to the 'accumulator' in the claims of the invention. The motor ECU 40 performing the non-illustrated short circuit abnormality detection routine that detects the abnormality that one of the transistors T7 through T12 of the inverter 42 is fixed in its on state based on the phase currents from the current sensors 46U, 46V, and 46W corresponds to the 'closed circuit forming abnormality detection module' in the claims of the invention. The hybrid electronic control unit 70 executing the processing of step S120 in the direct transmitting drive mode drive control routine of FIG. 3 to set the torque demand T* based on the accelerator opening Acc and the vehicle speed V corresponds to the 'driving force demand setting module' in the claims of the invention. The combination of the hybrid electronic control unit 70, the engine ECU 24 controlling the engine 22 based on the received target rotation speed Ne* and target torque Te*, and the motor ECU 40 performing switching control of the transistor T7 through T12 to have the inverter 42 be in the three-phase short circuited state and switching control of the inverter 41 for the motors MG1 with the torque command Tm1* in the embodiment corresponds to the 'controller' in the claims of the invention. The hybrid electronic control unit 70 executing the processing of step S100 and S130 through S200 in the direct transmitting drive mode drive control routine of FIG. 3, upon the detection of the abnormality that one phase of the three-phase coils is short circuited in the motor MG2, to give an instruction to the motor ECU 40 to have the inverter 42 stopped in the three-phase short circuited state and to set the target rotation speed Ne* with the target torque Te* of the engine 22 and the torque command Tm1* of the motor MG1 so that the hybrid vehicle 20 is driven with the execution torque Tr* based on the sum of the torque demand T*, a torque for cancelling the counter electromotive force application torque Tb, and a corresponding torque to the steering angle application torque Ts, and to send the settings to the engine ECU 24 and the motor ECU 40. The power distribution integration mechanism 30 in the embodiment corresponds to the 'three shaft-type power input output structure' in the claims of the invention. The motor MG3 in the embodiment corresponds to the 'second motor' in the claims of the invention. The inverter 243 in the modified example corresponds to the 'third inverter circuit' in the claims of the invention. The pair-rotor motor 330 in the modified example also corresponds to the 'generator' and the 'electric power-mechanical power input output assembly' in the claims of the invention. The inverter 341 in the modified example also corresponds to the 'first inverter circuit' in the claims of the invention.

The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'electric power-mechanical power input output assembly' is not restricted to the combination of the power distribution integration mechanism 30 with the motor MG1 or to the pair-rotor motor 330, but may be any structure having a generator constructed to input and output power, linked to an axle of the vehicle and connected with an output shaft of the internal combustion engine in such a manner as to be rotatable independently of the axle, and configured to input and output power to and from the axle and the output shaft through input and output of electric power and mechanical power. The 'generator' is not restricted to the motor MG1 constructed as a synchronous motor generator or the pair-rotor motor 330, but may be any type of generator constructed to input and output power, for example, an induction motor. The 'motor' is not restricted to the motor MG2 constructed as a known PM type synchronous motor generator but may be any type of motor constructed to input and output power to and from the axle that the electric power-mechanical power input output assembly is connected or a different axle from the axle and to generate a counter electromotive force by rotation. The 'first inverter' is not restricted to the inverter 41 or the inverter 341 but may be any other inverter for driving the generator. The 'second inverter' is not restricted to the inverter 42 but may be any other inverter for driving the motor. The 'accumulator' is not restricted to the battery 50 as a secondary battery but may be a capacitor or any other storage unit configured to supply and receive electric power to and from the generator and the motor via the first inverter circuit and the second inverter circuit. The 'closed circuit forming abnormality detection module' is not restricted to the arrangement of detecting the abnormality that one of the transistors T7 through T12 of the inverter 42 is fixed in its on state based on the phase currents from the current sensors 46U, 46V, and 46W, but may be any other arrangement of detecting a closed circuit forming abnormality that at least one closed circuit is formed in a part of phases of the second inverter circuit, for example, an arrangement of detecting the abnormality based on temperatures from temperature sensors for detecting respective temperatures of the transistors T7 through T12. The 'driving force demand setting module' is not restricted to the arrangement of setting the torque demand T* based on the accelerator opening Acc and the vehicle speed V but may be any other arrangement of setting a driving force demand required for driving the vehicle, for example, an arrangement of setting the torque demand based only on the accelerator opening Acc or an arrangement of setting the torque demand based on a location of the vehicle on a preset drive route. The 'controller' is not restricted to the combination of the hybrid electronic control unit 70 with the engine ECU 24 and the motor ECU 40 but may be actualized by a single electronic control unit. The 'controller' is not restricted to the arrangement of performing switching control to have the inverter 42 stopped in the three-phase short circuited state and controlling the engine 22 and the motor MG1 by setting the target rotation speed Ne* with the target torque Te* of the engine 22 and the torque command Tm1* of the motor MG1 so that the hybrid vehicle 20 is driven with the execution torque Tr* based on the sum of the torque demand T*, a torque for cancelling the counter electromotive force application torque Tb, and a corresponding torque to the steering angle application torque Ts, but may be any other arrangement of, when the closed circuit forming abnormality is detected by the closed circuit forming abnormality detection module, controlling the second inverter circuit so that switching elements of the second inverter circuit are stopped in a preset switching state while controlling the internal combustion engine and the first inverter circuit so that the vehicle is driven with an execution driving force that is a driving force based on a sum of the set driving force demand and a cancellation driving force for canceling at least a part of a braking force applied to the vehicle from the counter electromotive force generated by rotation of the motor. The 'three shaft-type power input output structure' is not restricted to the power distribution integration mechanism 30 but may be any structure connected to three shafts, a driveshaft linked to the axle of the vehicle, the output shaft of the internal combustion engine, and a rotating shaft of the generator, and designed to input and output power to residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism. The 'second motor' is not restricted to the motor MG3 but may be any type of motor constructed, as different from the motor such as the motor MG2, to supply and receive electric power to and from the accumulator and to input and output power to and from the axle that the electric power-mechanical power input output assembly is connected or a different axle of the vehicle from the axle. The 'third inverter circuit' is not restricted to the inverter 243 but may be any other inverter for driving the second motor.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the vehicles.

The invention claimed is:

1. A vehicle, comprising:
an internal combustion engine;
an electric power-mechanical power input output assembly, having a generator constructed to input and output power, linked to an axle of the vehicle and connected with an output shaft of the internal combustion engine in such a manner as to be rotatable independently of the axle, and configured to input and output power to and from the axle and the output shaft through input and output of electric power and mechanical power;
a motor constructed to input and output power to and from the axle of the vehicle or a different axle of the vehicle from the axle and to generate a counter electromotive force by rotation;
a first inverter circuit for driving the generator;
a second inverter circuit for driving the motor;
an accumulator configured to supply and receive electric power to and from the generator and the motor via the first inverter circuit and the second inverter circuit;
a short circuit abnormality detection module that detects a short circuit abnormality that at least one short circuit is formed in a part of phases of the second inverter circuit;
a driving force demand setting module that sets a driving force demand required for driving the vehicle; and
a controller configured to, when the short circuit abnormality is detected by the short circuit abnormality detection module, control the second inverter circuit so that switching elements of the second inverter circuit are stopped in a preset switching state while controlling the internal combustion engine and the first inverter circuit so that the vehicle is driven with an execution driving force that is a driving force based on a sum of the set driving force demand and a cancellation driving force for canceling at least a part of a braking force applied to the vehicle from the counter electromotive force generated by rotation of the motor.

2. The vehicle in accordance with claim 1, wherein the preset switching state is a switching state that short circuits are formed in all phases of the second inverter circuit.

3. The vehicle in accordance with claim 1, wherein the controller is configured to control the internal combustion engine and the first inverter circuit using the cancellation driving force that is obtained from a rotation speed-driving force relation predetermined as a relation between a rotation speed of the motor and the cancellation driving force.

4. The vehicle in accordance with claim 1, wherein the controller is configured to set a steering angle driving force to be greater as a steering angle of the vehicle increases and control the internal combustion engine and the first inverter circuit using the execution driving force as a sum of the set steering angle driving force, the cancellation driving force and the set driving force demand.

5. The vehicle in accordance with claim 1, wherein the controller is configured to control the internal combustion engine and the first inverter circuit so that the vehicle is driven with the execution driving force within a range of input and output limits defined as allowable charging and discharging electric power to be charged in and discharged from the accumulator.

6. The vehicle in accordance with claim 1, further including:
- a second motor constructed, as different from the motor, to supply and receive electric power to and from the accumulator and to input and output power to and from the axle of the vehicle or a different axle of the vehicle from the axle; and
- a third inverter circuit for driving the second motor,
- wherein the controller is configured to control the internal combustion engine, the first inverter circuit and the third inverter circuit so that the vehicle is driven with the execution driving force while outputting power from the second motor.

7. The vehicle in accordance with claim 1, wherein the electric power-mechanical power input and output assembly includes a three shaft-type power input output structure connected to three shafts, a driveshaft linked to the axle of the vehicle, the output shaft of the internal combustion engine, and a rotating shaft of the generator, and designed to input and output power to residual shaft based on powers input from and output to any two shafts among the three shafts.

8. A driving apparatus included, along with an internal combustion engine and an accumulator capable of charge and discharge, in a power output apparatus capable of outputting power to a driveshaft, the driving apparatus comprising:
- an electric power-mechanical power input output assembly, having a generator constructed to input and output power, connected with the driveshaft and with an output shaft of the internal combustion engine in such a manner as to be rotatable independently of the driveshaft, and configured to supply and receive electric power to and from the accumulator and to input and output power to and from the driveshaft and the output shaft through input and output of electric power and mechanical power;
- a motor constructed to input and output power to and from the driveshaft and to generate a counter electromotive force by rotation;
- a first inverter circuit connected to the accumulator for driving the generator;
- a second inverter circuit connected to the accumulator for driving the motor;
- a short circuit abnormality detection module that detects a short circuit abnormality that at least one short circuit is formed in a part of phases of the second inverter circuit;
- a driving force demand setting module that sets a driving force demand required for the driveshaft; and
- a controller configured to, when the short circuit abnormality is detected by the short circuit abnormality detection module, control the second inverter circuit so that switching elements of the second inverter circuit are stopped in a preset switching state while controlling the first inverter circuit along with control of the internal combustion engine so that an execution driving force is output to the driveshaft, the execution driving force being a driving force based on a sum of the set driving force demand and a cancellation driving force for canceling at least a part of a braking force applied to the driveshaft from the counter electromotive force generated by rotation of the motor.

9. A control method of a vehicle, the vehicle including: an internal combustion engine; an electric power-mechanical power input output assembly, having a generator constructed to input and output power, linked to an axle of the vehicle and connected with an output shaft of the internal combustion engine in such a manner as to be rotatable independently of the axle, and configured to input and output power to and from the axle and the output shaft through input and output of electric power and mechanical power; a motor constructed to input and output power to and from the axle of the vehicle or a different axle of the vehicle from the axle and to generate a counter electromotive force by rotation; a first inverter circuit for driving the generator; a second inverter circuit for driving the motor; and an accumulator configured to supply and receive electric power to and from the generator and the motor via the first inverter circuit and the second inverter circuit, the control method, upon occurrence of a short circuit abnormality that at least one short circuit is formed in a part of phases of the second inverter circuit, controlling the second inverter circuit so that switching elements of the second inverter circuit are stopped in a preset switching state while controlling the internal combustion engine and the first inverter circuit so that the vehicle is driven with an execution driving force that is a driving force based on a sum of a driving force demand required for driving the vehicle and a cancellation driving force for canceling at least a part of a braking force applied to the vehicle from the counter electromotive force generated by rotation of the motor.

\* \* \* \* \*